United States Patent
Johnston

(10) Patent No.: US 8,484,148 B2
(45) Date of Patent: Jul. 9, 2013

(54) PREDICTING WHETHER STRINGS IDENTIFY A SAME SUBJECT

(75) Inventor: Carolyn P. Johnston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 12/474,258

(22) Filed: May 28, 2009

(65) Prior Publication Data

US 2010/0306148 A1  Dec. 2, 2010

(51) Int. Cl.
*G06N 5/04* (2006.01)
*G06F 15/18* (2006.01)

(52) U.S. Cl.
USPC .............................. 706/46; 706/12

(58) Field of Classification Search
USPC .......................... 706/46; 707/6, 7
See application file for complete search history.

(56) References Cited

U.S. PATENT DOCUMENTS

| | | | |
|---|---|---|---|
| 6,523,019 B1 | 2/2003 | Borthwick | |
| 6,826,568 B2 | 11/2004 | Bernstein | |
| 2008/0065633 A1* | 3/2008 | Luo et al. | 707/6 |
| 2008/0183693 A1 | 7/2008 | Arasu | |
| 2009/0171955 A1* | 7/2009 | Merz et al. | 707/6 |

* cited by examiner

*Primary Examiner* — Jeffrey A Gaffin
*Assistant Examiner* — Ola Olude Afolabi
(74) *Attorney, Agent, or Firm* — Shook Hardy & Bacon LLP

(57) ABSTRACT

The present invention is directed to predicting whether two character strings refer to a same subject. An exemplary embodiment includes using a set of character-string pairs, which have been identified as either matches or nonmatches, to learn a function. The function can then be applied to the two character strings to quantify a likelihood that they refer to the same subject matter. For example, a kernel-based classifier analyzes the set of character-string pairs using a kernel function. Based on the analysis the classifier can generate parameters. The parameters are usable to define a prediction algorithm that when applied to the two character strings generates a prediction value, which suggests whether the two characters are matches, i.e., refer to the same subject matter.

20 Claims, 4 Drawing Sheets

PREDICTING WHETHER STRINGS IDENTIFY A SAME SUBJECT

BACKGROUND

Databases will often include sets of character strings, i.e., one or more words, that refer to and/or describe a same subject matter, e.g., a name of an entity. Accordingly, in various circumstances, e.g., deduplication, it is desirable that these sets of character strings, are identified as referring to the same subject matter. A system that is trained based on known examples is usable to predict that two character strings might refer to the same subject matter.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In one aspect, the present invention is directed to predicting whether two unlabeled character strings, e.g., business names, which have not been identified as either a match or nonmatch, refer to a same subject matter, e.g., entity. An exemplary embodiment includes using a set of character-string pairs, which have been identified, e.g., labeled, as either matches or nonmatches, to train a kernel-based classifier to learn a function. The function can then be applied to the two unlabeled character strings to quantify a likelihood that they refer to the same subject matter. For example, the set of character-string pairs are mapped using a kernel function, and an inner product is determined. Using this training process, the kernel-based classifier can generate parameters. The parameters are usable to define a prediction algorithm that when applied to the two unlabeled character strings generates a prediction value, which suggests whether the two characters are matches, i.e., refer to the same subject matter.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

An embodiment of the present invention is directed to predicting whether two character strings, which are stored in a database, refer to a same subject matter. For example, in various circumstances, e.g., database deduplication and named-entity disambiguation, it is desirable to determine whether two character strings refer to the same entity, so that those character strings can be associated in the database in a manner that provides better organization, more efficient searching of records, record consolidation, etc. The phrase "character string" is used herein to denote a set of characters, e.g., letters, numbers, and/or symbols, that are grouped to create words or other text that is usable to identify something. In illustrative embodiments character strings include sets of letters that are grouped into words to identify entities, e.g., business entities. However, character strings might be grouped together to form indicia of a variety of subject matter.

Figure 2:
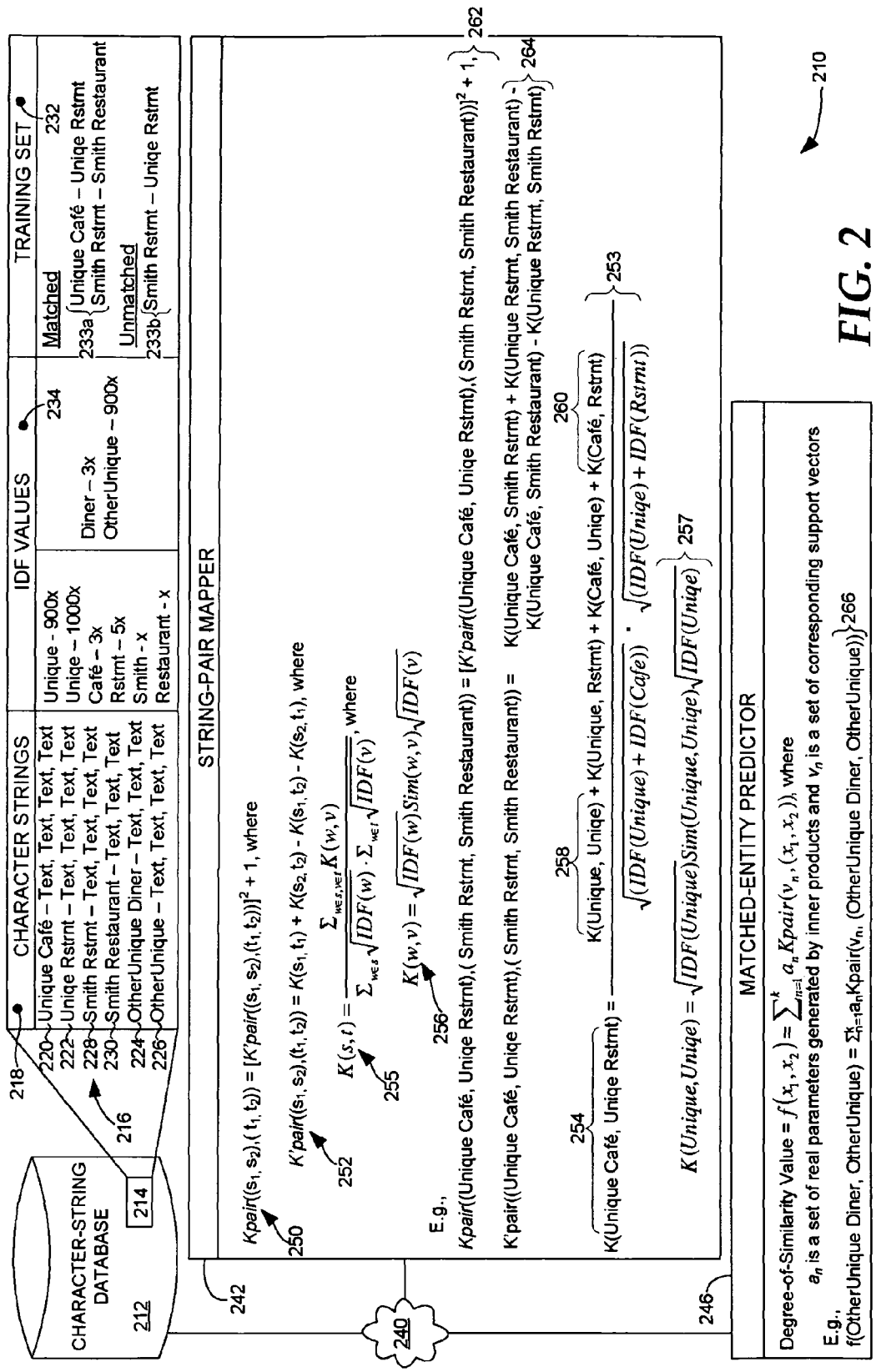
FIG. 2 depicts a schematic diagram of an illustrative operating environment suitable for predicting whether character strings identify a same subject, in accordance with an embodiment of the present invention.

An exemplary database is depicted in FIG. 2 and identified generally by reference numeral 212. Although database 212 is depicted as only one database, database 212 might also include a plurality of databases. Database 212 includes data 214, which is shown for illustrative purposes in an expanded view 216. Expanded view 216 illustrates that database 212 stores various text documents, which include character strings. Exemplary text documents and character strings are shown under column 218, which is labeled "Character Strings." While for illustrative purposes a limited number of text documents and character strings are depicted under column 218, in an embodiment of the present invention, database 212 includes a much larger quantity of character strings within text documents. Expanded view 216 also includes a column labeled "Training Set," which is identified by reference numeral 232. Training-set column 232 includes character strings from column 218 that have been identified as either "Matches" 233a or "Non-matches" 233b. For example, character string 220 includes a set of characters that read "Unique Café," and character string 222 includes a set of characters that read "Uniqe Rstrnt." As indicated under training-set column 232, character string 220 and character string 222 have been identified as matches, i.e., it has been determined that they refer to the same entity. Moreover, character strings 222 and 228 have been identified as nonmatches, i.e., it has been determined that they refer to different entities. As depicted, training-set column 232 does not include some character strings, e.g., character strings 224 and 226, that are in column 218 and that have not yet been identified or labeled as matches or non-matches, i.e., it is not yet known whether character strings 224 and 226 refer to the same entity. Accordingly, an exemplary embodiment of the present invention includes determining whether unlabeled character strings, e.g., character strings 224 and 226, listed under column 218 refer to the same entity, such as by analyzing both whether character strings 224 and 226 include a similar set of characters and the extent to which character strings 224 and 226 include common and/or rare substrings.

An embodiment of the present invention includes a computing device. As such, referring now to FIG. 1, a general computing device is depicted and designated generally as computing device 100. Computing device 100 is but one example of a suitable computing environment and is not intended to suggest any limitation as to the scope of use or functionality of invention embodiments. Neither should the computing-environment 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

Figure 1:
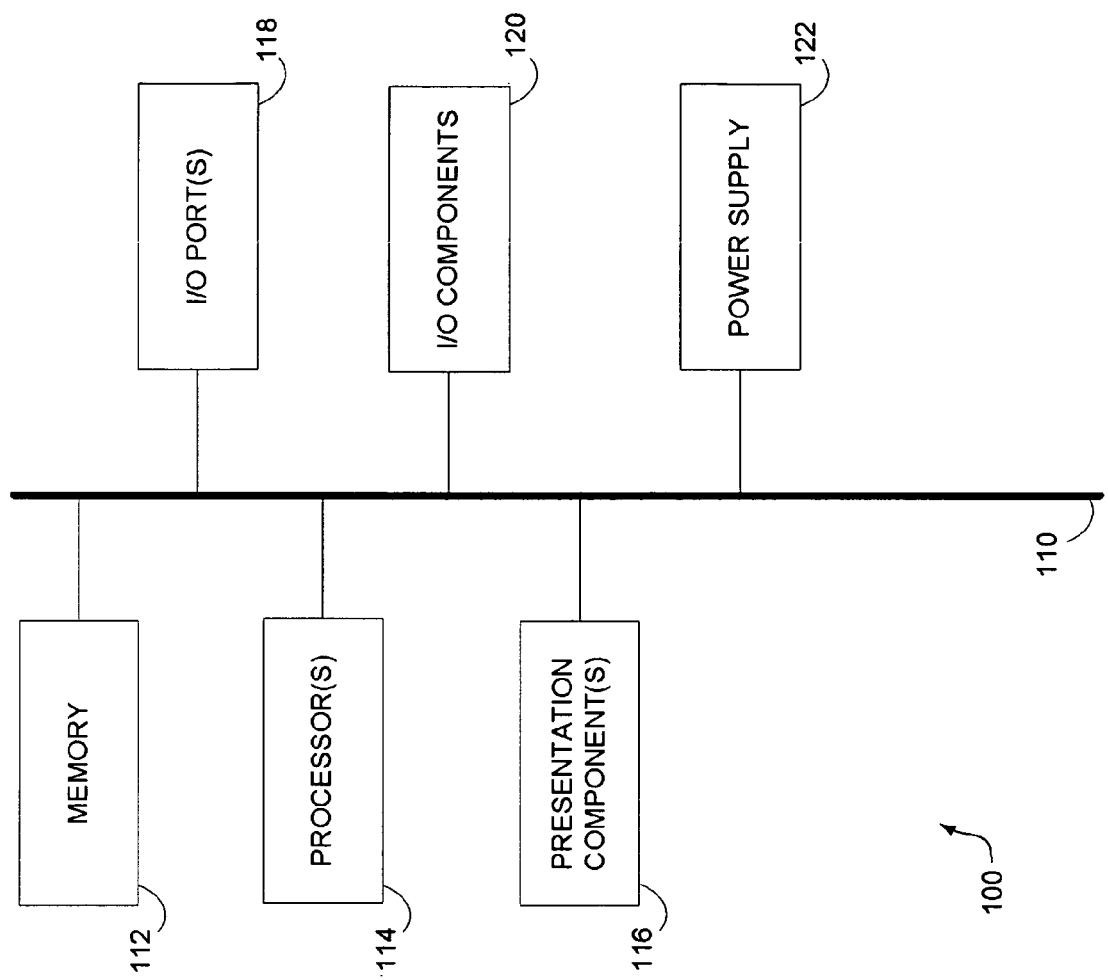
FIG. 1 depicts a block diagram illustrating certain components of an illustrative computing device suitable for practicing an embodiment of the present invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. In addition, a computer-readable memory device excludes media that is comprised of only carrier waves, only signals, and only transitory media. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Returning to FIG. 2, an illustrative operating environment 210 is depicted that is suitable for predicting whether character strings identify a same subject matter. As previously described, environment 210 includes database 212, which stores text documents having character strings. Database 212 includes data 214, which is shown for illustrative purposes in expanded view 216. Expanded view 216 includes character strings 220, 222, 224, 226, 228, and 230, each of which includes a different set of characters. For example, character string 220 includes a set of characters that reads "Unique Café" and character string 230 includes a set of characters that reads "Smith Restaurant." Moreover, expanded view 216 includes training-set column 232, which includes sets of character strings that have been identified as either matches 233a or non-matches 233b. Training-set column 232 merely illustrates that a determination has been made that certain character strings, e.g., Unique Café and Uniqe Rstrnt, refer to the same entity and that those character strings have been identified and/or labeled as matches 233a. Moreover, training-set column 232 depicts that a determination has been made that other character strings, e.g., Smith Rstrnt and Uniqe Rstrnt, do not refer to a same entity and that those character strings have been identified and/or labeled as non-matches 233b. Matches 233a and non-matches 233b are listed in a column for illustrative purposes; however, in other embodiments character strings that have been matched might not actually be listed in a column, but instead are identified as being either matches or non-matches by other means, e.g. mapping, grouping, etc. Database 212 also includes column 234, which is labeled "IDF values." Column 234 lists for each word in character strings 220, 222, 224, 226, 228, and 230 a determined inverse document-frequency (IDF) value, which will be described in more detail below.

Figure 4:
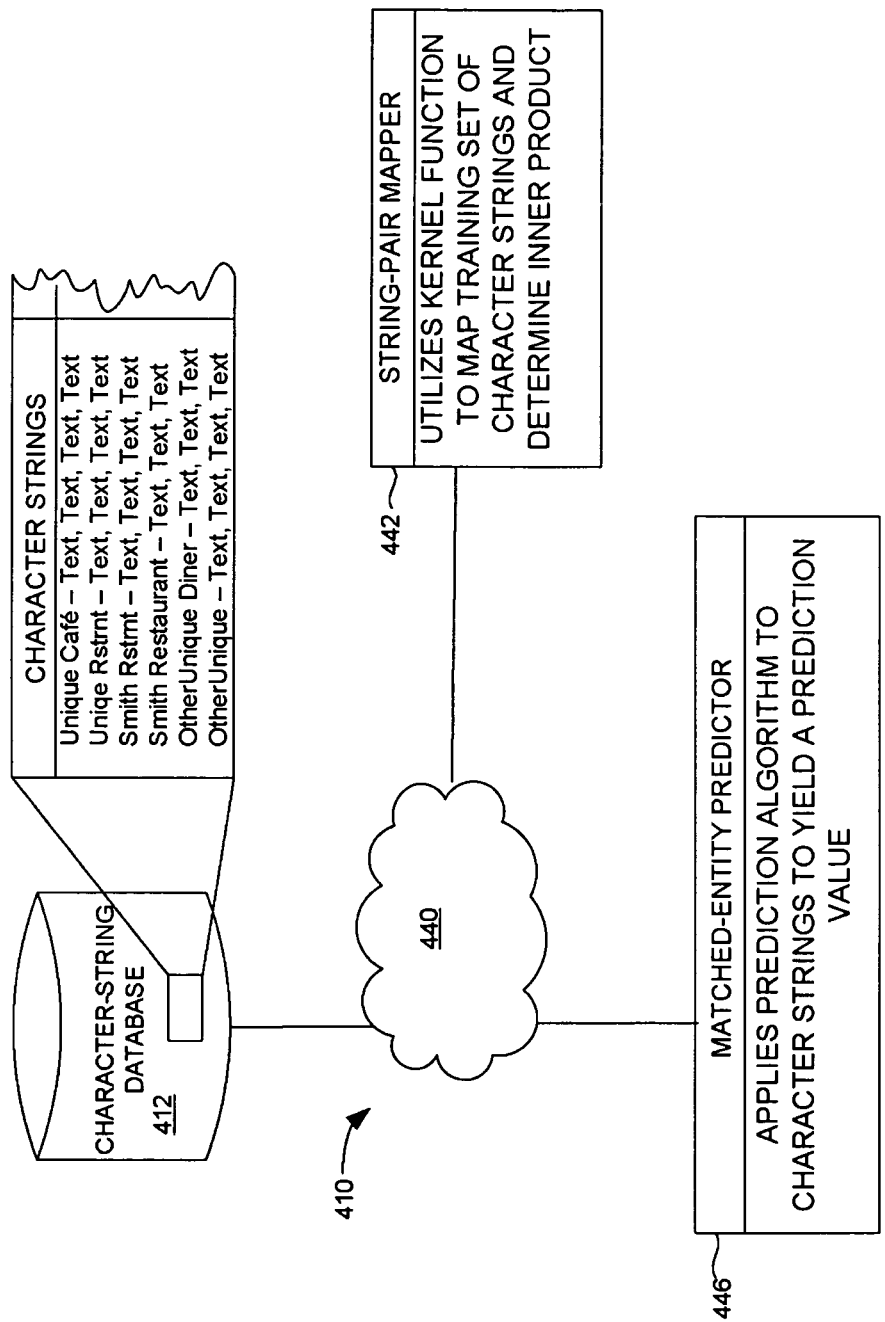
FIG. 4 depicts a schematic diagram of an illustrative operating environment suitable for predicting whether character strings identify a same subject, in accordance with an embodiment of the present invention.

Turning briefly to FIG. 4, a more generic illustrative operating environment 410 is depicted that is suitable for predicting whether character strings identify a same subject matter. The components depicted in FIG. 4 correspond with components that are depicted in FIG. 2, e.g., database 212 of FIG. 2 corresponds with database 412 of FIG. 4. As can be seen, database 412 is connected by way of network 440 with various other components, which include string-pair mapper 442 and matched-entity predictor 446. In embodiments of the present invention, each of string-pair mapper 442 and matched-entity predictor 446 include a computer component, such as a processor. Moreover, while each of string-pair mapper 442 and matched-entity predictor 446 are depicted in FIG. 4 as separate components, in an embodiment of the present invention they are combined into one component. In another embodiment, each of string-pair mapper 442 and matched-entity predictor 446 include a computer-readable medium, which has computer-executable instructions embodied thereon that, when executed, cause a computing device to perform respective functions. Accordingly, in an embodiment of the present invention, database 412 is usable, together with string-pair mapper 442 and matched-entity predictor 446, to predict whether two character strings refer to a same subject. For example, string-pair mapper 442 uses a kernel function to map a training set of character strings, e.g., those character strings identified under the training-set column in database 412. Moreover, an inner product of the mapping of character strings is determined. Furthermore, matched-entity predictor 446 applies a prediction algorithm to pairs of character strings, e.g., characters strings that have not be identified as either matches or non-matches and are stored in database 412, to yield a prediction value that is usable to estimate whether each pair of character strings are a matched pair, i.e., refer to the same entity. Each of these components and their respective functions will be described in more detail below.

In an embodiment of the present invention, predicting whether two character strings refer to a same subject includes measuring an extent to which the character strings share similar characters. For example, although the terms "Restaurant" and "Rstrnt" do not include the exact same characters, both terms include a similar set of characters, e.g., both terms include the characters r-s-t-r-n-t. Accordingly, embodiments of the present invention are able to determine that two terms are similar, even though one term might be spelled differently, spelled incorrectly, acronymized, abbreviated, etc.

In a further embodiment, relative degrees of rarity of character strings are taken into account when determining if two character strings refer to a same entity. For example, although two character strings might include similar characters, if one or both of the character strings are relatively common terms, e.g., "Smith" or "Restaurant," the likelihood that the two terms refer to a same entity is less than if the two character strings were relatively uncommon terms, e.g., "Ratatouille."

In another embodiment of the present invention, an algorithm that is learned based on training data is usable to predict whether two terms refer to the same subject. For example, it might be difficult to create a comprehensive rule-based system to determine if all potential character-string pairs are either matches or nonmatches because new character strings, new spellings/misspellings, etc., are introduced on a regular basis. Accordingly, an embodiment of the present invention includes predicting whether terms refer to a same subject based on similarity and rarity of known matches and non-matches.

One embodiment of the present invention includes using a kernel function to train a kernel-based classifier, which is usable to predict whether two character strings refer to a same entity. For example, in an embodiment of the present invention, character-string pairs are used to train a kernel Support Vector Machine ("SVM"), using the kernel function. Although an SVM is used in one embodiment, other embodiments include any dual linear learning algorithm that admits a kernel. As such, in an embodiment of the invention, predicting whether two character strings refer to a same entity can occur in different phases. For example, one phase includes applying a kernel function to a training set of character strings, e.g., character strings identified in training-set column 232, to train a kernel-based classifier to learn a prediction algorithm. Another phase includes using the prediction algorithm to predict whether two unlabeled character strings, e.g., character strings 224 and 226, are matches or non-matches.

An exemplary embodiment of using a kernel function to train a learning algorithm in accordance with the present invention is depicted in FIG. 2, in which a kernel function is depicted being applied to character strings 220, 222, 228, and 230, i.e., those character strings in training-set column 232. Although for illustrative purposes FIG. 2 only depicts an application of a kernel function to two pairs of character strings, in other embodiments of the invention, the kernel function is applied to numerous additional pairs of characters strings. As previously indicated, IDF values for each word within character strings 220, 222, 224, 226, 228, and 230 are determined. An IDF value represents one type of frequency measurement, i.e., a measurement of the frequency with which a word occurs in a set of text documents. More specifically, an IDF value (as it is used in an embodiment of the present invention) represents an inverse measure of a frequency with which a character string occurs within a corpus of text documents in database 212, i.e., words that occur in text documents more frequently have lower IDF values, whereas words that occur in text documents less frequently have higher IDF values. For example, FIG. 2 depicts that "Restaurant," which is a relatively common word, has an IDF value that is equal to x, whereas "Unique," which is a relatively uncommon word within the text documents in database 212, has an IDF value that is equal to 900 times x. One equation that is usable to calculate an IDF value of a word includes log(total number of documents/number of appearances of the word in the documents).

In an embodiment of the present invention, a kernel function is usable to map a training set of character strings into a feature space and determine an inner product. One such kernel function includes the following:

$$K\text{pair}((s_1,s_2),(t_1,t_2))=[K'\text{pair}((s_1,s_2),(t_1,t_2))]^2+1 \quad (1)$$

wherein $(s_1, s_2)$ and $(t_1, t_2)$ each represent respective character-string pairs and K'pair represents a term that will be described in more detail below. Kpair is identified in FIG. 2 by reference numeral 250 and is depicted as an operation that is executed by string-pair mapper 242. In one embodiment, Kpair is used in a kernel SVM, or other kernel-based classifier, to analyze a set of training data and determine a set of parameters, which are usable to define a prediction algorithm. An example of how Kpair might be applied to training-data values is depicted by equation 262.

In embodiments of the invention, Kpair includes a term K'pair, which is represented by:

$$K'\text{pair}((s_1,s_2),(s_1,t_1))=K(s_1,t_1)+K(s_2,t_2)-K(s_1,t_2)-K(s_2,t_1) \quad (2)$$

wherein a term K(s, t), which will be described in more detail below, is applied to various character-string pairs. K'pair is identified in FIG. 2 by reference numeral 252. FIG. 2 includes equation 264, which illustrates how K'pair might be applied in the context of equation 262, i.e., K'pair is a component of Kpair and is applied in the context of a kernel-based classifier using Kpair to map and determine an inner product of a training set. Again, while FIG. 2 only depicts an application of Kpair to a small number of character strings, in embodiments of the invention, Kpair is used to analyze a large number (e.g. thousand, tens-of-thousands, hundreds-of-thousands, etc.) of character-string pairs that is sufficient to learn an accurate predicting algorithm.

In an embodiment of the present invention, Kpair is applied to numerous pairs of character strings in a training set, and each pair has been identified as either a match or a nonmatch. Kernel function (1) is defined such that pairs of similar character strings (e.g., similar business names) should have small differences in a high dimensional feature space. The more similar that two character strings are, the smaller the norm of the mapped pair. As such, vectors for matched pairs should cluster around the origin in the high dimensional feature space, and vectors for unmatched pairs should be farther from the origin, thereby generating a hyper-ellipsoid centered roughly on the origin that encapsulates most of the matched pairs. In a further embodiment, the kernel-based classifier determines a set of parameters (and corresponding support vectors) that are based on the mapping and that are usable to define a prediction algorithm. As will be described in more detail below, the prediction algorithm can then be applied to a pair of character strings that have not yet been identified as either matches or non-matches, to yield an estimate of the likelihood that the pair is a match, i.e., refers to a same entity.

As previously indicated K'pair (equation (2)) includes a term K(s,t). As K'pair is a term within Kpair, the term K(s,t) is also a component of Kpair. In an embodiment of the present invention, K(s,t) combines measures of both document frequency and string similarity and is usable to map the training set to a feature space. In an embodiment of the invention K(s, t) is represented by:

$$K(s, t) = \frac{\sum_{w \in s, v \in t} K(w, v)}{\sum_{w \in s} \sqrt{IDF(w)} \cdot \sum_{v \in t} \sqrt{IDF(v)}}, \quad (3)$$

wherein s and t represent two character strings of the training set of data that have been identified as either matches or nonmatches, w represents a word within character string s, and v represents a character string within character string t. Moreover, function (3) includes another term K(w,v), which will be described in more detail below. Function (3) is identified by reference numeral 255 and an example of how K(s,t) might be applied in the context of Kpair is depicted by equation 253. Function (3) includes a division by normalization terms, which takes into account individual words having different document-frequency values. For example, even though character string 228 ("Smith Rstrnt") and character string 230 ("Smith Restaurant") include similar sets of characters, the fact that each of Smith, Restaurant, and Rstrnt are relatively common words, i.e., have low IDF values, makes it less likely that character strings 228 and 230 are referring to the same entity. On the other hand, character string 220 ("Unique Café") and character string 222 ("Uniqe Rstrnt") include similar sets of characters and include relatively uncommon words (i.e., words that have high IDF values), such that it is more likely that character strings 220 and 222 are referring to the same entity. Division by normalization terms in kernel function (3) takes into account this word-rareness variable. Examples of how kernel function (3) might be applied to training data in order to map the data into a feature space is depicted in FIG. 2. For example, equation 253 includes character-string pair 254 including Unique Café and Unique Rstrnt, each of which represent variables s and t respectively.

As previously indicated, in an embodiment of the present invention function (3) includes another term K(w,v), which is defined as:

$$K(w,v) = \sqrt{IDF(w)} Sim(w,v) \sqrt{IDF(v)}, \quad (4)$$

wherein Sim(w, v) includes a measure of similarity between a word (w) and a word (v). In an exemplary embodiment, Sim(w, v) includes any kernel that is defined on pairs of words. For example, Sim(w, v) might include a string-subsequence kernel of order n=3 and decay coefficient λ=0.8. In a further embodiment, a Sim(w, v) that is selected for application to function (4) generates a cosine between words that is nearly 1 when the two words include a relatively similar set of characters. Function (4) is identified by reference numeral 256, and represents a subcomponent of operations performed by string-pair mapper 242. As described above, kernel function (3) includes a term K(w, v), such that function (4) is applied to each word within the character strings. For example, in equation 253 reference numeral 258 indicates that function (4) is applied to Unique and Uniqe, and reference numeral 260 indicates that function (4) is applied to Café and Rstrnt. In FIG. 2 equation 257 depicts an example of an application of function (4) to Unique and Uniqe.

In a further embodiment of the present invention, a kernel-based classifier generates parameters (and corresponding support vectors) based on an analysis, i.e., mapping and inner-product determination, of the training data by applying Kpair. The parameters and support vectors can be used to define a prediction algorithm, which is usable to quantify a likelihood that character strings refer to the same subject matter. In an exemplary embodiment, the prediction algorithm is represented by:

$$f(x_1, x_2) = \sum_{n=1}^{k} a_n Kpair(v_n, (x_1, x_2)), \quad (5)$$

wherein $a_n$ represents a set of real parameters, $v_n$ represents corresponding support vectors, Kpair is represented by equation (1) that was previously described, and $x_1$ and $x_2$ are two character strings for which a prediction is to be made as to whether they refer to a similar subject matter. The prediction algorithm (5) is depicted in FIG. 2 as a function of the matched-entity predictor 246. In an embodiment of the invention if $f(x_1, x_2)$ is greater than or equal to zero, then $x_1$ and $x_2$ are labeled as matches. However, if $f(x_1,x_2)$ is less than zero, then $x_1$ and $x_2$ are labeled as nonmatches. The prediction algorithm represents a runtime algorithm that is learned by a kernel-based classifier as a result of analyzing training data using the kernel function, e.g., equation (1). An exemplary application of the prediction algorithm (5) is depicted in FIG. 2. As previously indicated, within the character strings of database 212, character string 224 (including "OtherUnique Diner") and character string 226 (including "OtherUnique") have not yet been identified as either matches or non-matches. Accordingly, in equation 266 the prediction algorithm is depicted being applied to character strings 224 and 226.

As previously described, an embodiment of the present invention might conceptually be divided into two phases—a first phase in which a prediction algorithm is learned and a second phase in which the prediction algorithm is applied to character strings. The above description of string-pair mapper 242 and Kpair outline an embodiment of the first phase, as a result of which, a prediction algorithm is learned by a kernel-based classifier. With respect to phase two, equation 266 represents an application of the prediction algorithm, wherein a value of zero or greater suggests that character strings are matches and a value of less than zero suggests that character strings are nonmatches.

Figure 3:
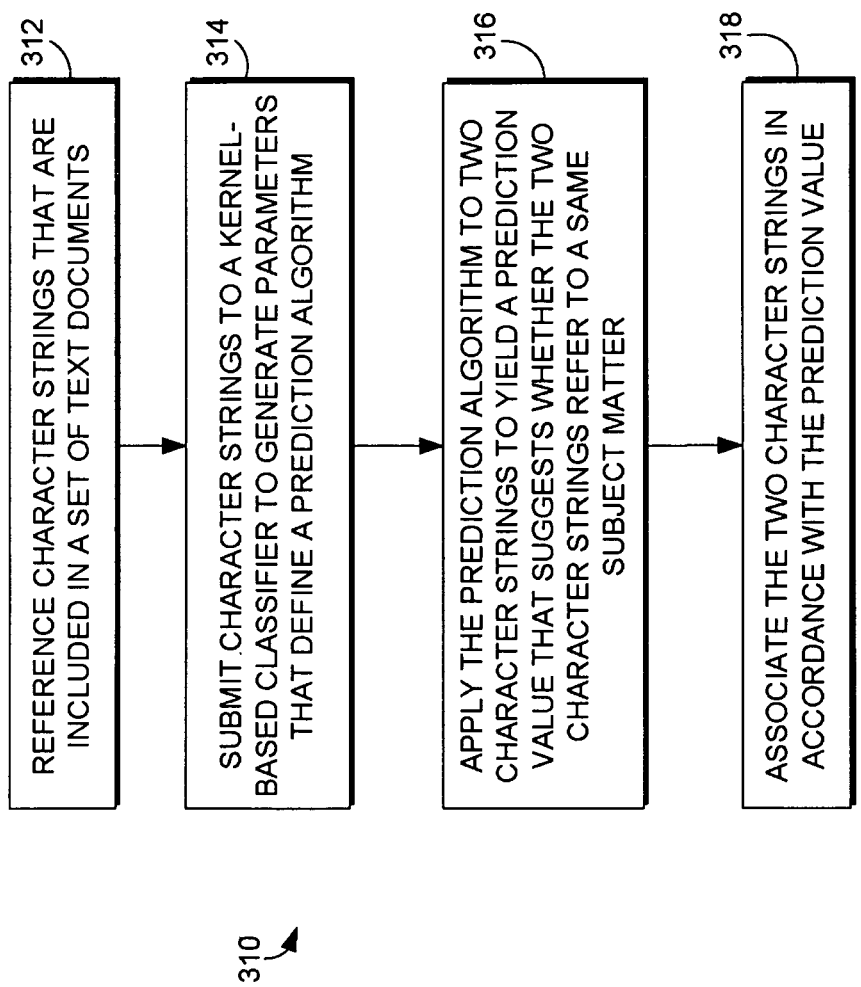
FIG. 3 depicts a flow diagram showing an illustrative method of predicting whether character strings identify a same subject, in accordance with various embodiments of the present invention.

Referring now to FIG. 3, an illustrative method is depicted by a flow diagram, the method being identified generally by reference numeral 310. Method 310 includes at step 312 referencing character strings that are included in a set of text documents. For example, character strings 220, 222, 228, and 230, which are stored in database 212, might be referenced. Step 314 includes submitting the referenced character strings to a kernel-based classifier to generate parameters that define a prediction algorithm. For example, Kpair (function (1)) might be applied by the kernel-based classifier to map, and define an inner product of, character strings 220, 222, 228, and 230. Based on the mapping and inner product, the kernel-based classifier generates a set of parameters and corresponding support vectors that are usable to define prediction algorithm (5). In a further example, a kernel SVM utilizes Kpair to learn prediction algorithm (5). Step 316 includes applying the prediction algorithm to two character strings to yield a prediction value that suggests whether the two character strings refer to a same subject matter. For example, prediction algorithm (5) is applied to two character strings that have not yet been identified as matches or nonmatches, e.g., character strings 224 and 226 in database 212. At step 318, the two character strings are associated in accordance with the prediction value. For example, if the prediction value is greater than or equal to zero, the two character strings are identified as matches, i.e., identified as referring to the same subject. Alternatively, if the prediction value is less than zero, the two character strings are identified as nonmatches, i.e., identified as not referring to the same subject.

In one embodiment, the present invention includes computer-readable media having computer-executable instructions embodied thereon that, when executed, cause a computing device to perform a method of predicting whether character strings refer to a same subject matter. The method comprising identifying in a database a first character string and a second character string that are included in a set of text documents. The method further includes utilizing the computing device to generate a prediction value, which quantifies likelihood that the first character string and the second character string refer to the same subject matter, by applying a prediction algorithm to each of the first character string and the second character string. The prediction algorithm is determined based on an analysis of a training set of data, which includes a plurality of character strings that are included in the set of text documents and that are combinable into character-string pairs. In addition, the analysis of the training set of data includes generating from a mapping of the character-string pairs parameters that are usable to define the prediction algorithm. Moreover, the mapping is based on a first kernel function that combines a measure of similarity of a character-string pair with a measure of document frequency of strings of the character-string pair. The method also includes, based on the prediction value, associating in the database the first character string with the second character string.

In another embodiment, the present invention includes a computer-implemented method of predicting whether character strings refer to a same subject matter. The method comprises referencing in a database a first character string and a second character string that are included in a set of text documents. The method also includes utilizing a processor to apply a prediction algorithm to each of the first character string and the second character string, the prediction algorithm being usable to quantify a likelihood that the first character string and the second character string refer to the same subject matter. The prediction algorithm is learned by a support vector machine based on an inner product that is determined using a mapping of a training set of data and the mapping is based on a first kernel function that combines a measure of similarity of a character-string pair with inverse document-frequency values of strings of the character-string pair. The method also includes, based on a prediction value, which is generated by applying the prediction algorithm to each of the first string of characters and the second string of characters, associating in the database the first character string with the second character string.

Another embodiment of the present invention includes computer-readable media having computer-executable instructions embodied thereon that, when executed, cause a computing device to perform a method of predicting whether character strings refer to a same subject matter. The method comprises referencing in a database a plurality of character strings that are combinable into pairs of character strings and that are included in a set of text documents. Moreover, the method includes determining an inverse document-frequency value of each character string, wherein each inverse document-frequency value describes an inverse measure of a number of occurrences of a respective character string in the set of text documents. The method also comprises using the computing device to conduct an analysis of the plurality of character strings with a kernel-based classifier, which applies to the plurality of character strings a first kernel function. The first kernel function combines a measure of similarity between a pair of character strings and inverse document-frequency values of each string included in the pair of character strings. Based on the analysis, the kernel-based classifier determines a prediction algorithm, which is usable to determine whether two character strings include a similar set of characters; The method also includes using the computing device to calculate a prediction value, which quantifies a likelihood that the first character string and the second character string refer to the same subject matter, by applying the prediction algorithm to the two character strings.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-readable memory device storing computer-executable instructions that, when executed, cause a computing device to perform a method of predicting whether character strings refer to a same subject matter, the method comprising:
   identifying in a database a first character string and a second character string that are included in a set of text documents;
   utilizing the computing device to generate a prediction value, which quantifies likelihood that the first character string and the second character string refer to the same subject matter, by applying a prediction algorithm to each of the first character string and the second character string,
   (1) wherein the prediction algorithm is determined based on an analysis of a training set of data, which includes a plurality of character strings that are included in the set of text documents and that are combinable into character-string pairs,
   (2) wherein the analysis of the training set of data includes generating from a mapping of the character-string pairs parameters that are usable to define the prediction algorithm, and
   (3) wherein the mapping is based on a first kernel function comprising a mathematical combination of a square root of a first IDF of a character string included in the first character string, a square root of a second IDF of a character string included in the second character string, and a value quantifying a measure of similarity; and
   based on the prediction value, associating in the database the first character string with the second character string.

2. The computer-readable memory device of claim 1, wherein the first character string and the second character string each include a name of a business.

3. The computer-readable memory device of claim 2, wherein determining that each name of a business includes a similar set of characters is performed in a course of a deduplication process.

4. The computer-readable memory device of claim 1, wherein the prediction algorithm is a runtime algorithm that is determined by a dual linear learning algorithm that admits a kernel.

5. The computer-readable memory device of claim 4, wherein the dual linear learning algorithm is a support vector machine training algorithm.

6. The computer-readable memory device of claim 1, wherein the first kernel function is defined at least in-part by a string kernel.

7. The computer-readable memory device of claim 6, wherein the string kernel is a string-subsequence kernel.

8. The computer-readable memory device of claim 1, wherein the measure of similarity is determined using a decay factor that reduces an importance of a string of similar characters that are noncontiguous within at least one of the character strings.

9. The computer-readable memory device of claim 1, wherein when the prediction value is at least one of equal to and greater than zero, the first character string and the second character string are associated in the database as matches.

10. The computer-readable memory device of claim 1,
wherein an inner product is usable to generate both the parameters and corresponding support vectors, and
wherein the parameters and corresponding support vectors are usable to define the prediction algorithm.

11. A computer-implemented method of predicting whether character strings refer to a same subject matter, the method comprising:
referencing in a database a first character string and a second character string that are included in a set of text documents;
utilizing a processor to apply a prediction algorithm to each of the first character string and the second character string, the prediction algorithm being usable to quantify a likelihood that the first character string and the second character string refer to the same subject matter,
(1) wherein the prediction algorithm is learned by a support vector machine based on an inner product that is determined using a mapping of a training set of data, and
(2) wherein the mapping is based on a first kernel function comprising a mathematical combination of a first IDF of a character string included in the first character string, a second IDF of a character string included in the second character string, and a value quantifying a measure of similarity; and
based on a prediction value, which is generated by applying the prediction algorithm to each of the first string of characters and the second string of characters, associating in the database the first character string with the second character string.

12. The computer-implemented method of claim 11, wherein the support vector machine uses the inner product to generate a set of real parameters and a set of corresponding support vectors.

13. The computer-implemented method of claim 12, wherein the set of real parameters and the set of corresponding support vectors are terms in the prediction algorithm.

14. The computer-implemented method of claim 11,
wherein the inner product is determined using a positive definite kernel, which is based on the first kernel function, and
wherein the first kernel includes a string kernel that yields high cosine similarity when applied to character strings having similar sets of characters.

15. The computer-implemented method of claim 11, wherein when the prediction value is at least one of equal to and greater than zero, the first character string and the second character string are associated in the database as matches.

16. A system comprising a process coupled to a computer-readable memory device which stores computer-executable instructions that are executed by the processor and that perform a method of predicting whether character strings refer to a same subject matter, the method comprising:
referencing in a database a plurality of character strings that are combinable into pairs of character strings and that are included in a set of text documents;
determining an inverse document-frequency value of each character string, wherein each inverse document-frequency value describes an inverse measure of a number of occurrences of a respective character string in the set of text documents;
using the computing device to conduct an analysis of the plurality of character strings with a kernel-based classifier, which applies to the plurality of character strings a first kernel function,
(1) wherein the first kernel function comprises mathematical combination of a first IDF of a character string included in the first character string, a second IDF of a character string included in the second character string, and a value quantifying a measure of similarity; and
(2) wherein based on the analysis, the kernel-based classifier determines a prediction algorithm, which is usable to determine whether two character strings include a similar set of characters; and
using the computing device to calculate a prediction value, which quantifies a likelihood that the first character string and the second character string refer to the same subject matter, by applying the prediction algorithm to the two character strings.

17. The system of claim 16, wherein determining an inverse document-frequency value of a character string comprises determining a set of inverse document-frequency values, each of which describes a respective subsequence of characters included in the character string.

18. The system of claim 17, wherein the set of inverse document-frequency values is used to define the first kernel function.

19. The system of claim 16, wherein the measure of similarity is based on a string kernel that tolerates misspellings.

20. The system of claim 16, wherein the method further comprises:
if the prediction value is at least one of equal to or greater than zero, associating in the database the two different character strings as matches; and
if the degree-of-similarity value is less than zero, associating in the database the two different character strings as nonmatches.

* * * * *